May 26, 1959 V. DURBIN ET AL 2,888,520

GENERATOR-TRANSDUCER SWITCHING SYSTEM IN A TELEPHONE SYSTEM

Filed April 7, 1955 2 Sheets-Sheet 1

INVENTORS.
VERNON DURBIN
ERNEST W. JOHNSON
BY James and Franklin
ATTORNEYS.

GENERATOR-TRANSDUCER SWITCHING SYSTEM IN A TELEPHONE SYSTEM

Filed April 7, 1955 2 Sheets-Sheet 2

INVENTORS.
VERNON DURBIN
ERNEST W. JOHNSON
BY James and Franklin
ATTORNEYS.

United States Patent Office 2,888,520

Patented May 26, 1959

2,888,520

GENERATOR-TRANSDUCER SWITCHING SYSTEM IN A TELEPHONE SYSTEM

Vernon Durbin, Waban, and Ernest W. Johnson, Randolph, Mass., assignors to National Pneumatic Co., Inc., Boston, Mass., a corporation of Delaware Application April 7, 1955, Serial No. 499,782

10 Claims. (Cl. 179—81)

The present invention relates to novel means in a field telephone system or the like for controlling the electrical connections between the line on the one hand and a ringing generator or a transducer alternatively on the other hand.

In many telephone systems, and particularly in those adapted for use in the field by the Armed Forces or for use in less populated localities, means are provided at a given station for ringing another station or stations on the line. That means usually comprises a generator adapted to be rotated in order to produce an electrical signal which, when transmitted over the line to the other station, actuates a ringer at that other station. Means are provided for disconnecting from the line the transducers, and particularly the earphone, at the station where the ringing is initiated during the time that ringing occurs, since the ringing would otherwise produce a very disagreeable sound in the earpiece. Means are also provided for disconnecting the generator from the line when it is not being effectively employed for ringing purposes, not only to maximize the sensitivity of the receiver but also to prevent accidental actuation of the generator from producing noise on the line.

While the switching mechanism above referred to could be manual, in actuality it is almost universally automatic in nature. Various centrifugal switching arrangements have been adopted in the past to provide for such automatic switching, those arrangements being effective, when the generator is rotated at a given speed, to connect the generator to the line and at the same time disconnect the transducer from the line. When the speed of rotation of the generator falls below a predetermined value, the switch resumes its normal position connecting the transducers to the line and disconnecting the generator therefrom.

These mechanical switching arrangements are subject to many disadvantages, not the least of which is their size, complexity and expense. Moreover, they have a tendency to oscillate between their operative positions and thus produce an irregular or intermittent ringing signal if the speed of rotation of the generator fluctuates between values just above and just below the speed at which the switch is actuated to connect the generator and disconnect the transducers. Certain mechanical expedients have been devised to eliminate this effect, such as the use of the dashpots or magnets disclosed in application Ser. No. 279,991, of April 2, 1952, filed by Vernon Durbin, entitled "Dynamo Electric Machine," and assigned to the assignee of the instant invention. While effective in attaining the desired results, such devices nevertheless add greatly to the expense and complexity of the equipment and, particularly in connection with the use of dashpots, adversely affect the reliable life of the equipment.

The problems of size and weight mentioned above, while not particularly critical in industrial applications, is of prime importance in military applications. Since a field telephone may have to be carried long distances by an individual already heavily weighed down with fighting equipment, and since the transportation of the units to the point from which they are to be manually carried also often presents appreciable weight and space problems, particularly when air transportation is involved, the Armed Forces place great stress upon minimization of size and weight. Reliability of operation at all times and under all conditions is also a prime consideration in military equipment, where the cost of malfunction may be measured in human lives.

According to the present invention a new approach has been taken to the problem of switch control in a telephone system of the type under discussion. Instead of sensing the output of the ringing generator indirectly and mechanically, as has been done in the past, through the use of structural elements which must themselves be rotatably mounted and whose operation is dependent upon springs and numerous bearing surfaces which introduce appreciable frictional effects, the output of the generator is instead sensed directly and electrically, and that very output is employed to control the necessary switching operations. As a result no part of the switching mechanism nor of the actuating mechanism therefor need be rotated. The only moving parts in accordance with the present invention are the switching elements themselves and the armature of an electromagnetic relay which actuates those switching elements. Thus the switching is mechanically accomplished by standard units very extensively used in more conventional types of telephone systems, the reliability of which units over an almost infinite number of operations is well known.

To this end a portion of the output of the electrical output from the generator is caused to energize the relay coil. When that output reaches a predetermined magnitude the armature of the relay will be shifted and that armature in turn will move the switch elements so as to disconnect the transducers from the line and connect the generator thereto. When the output of the generator falls below a predetermined value the armature will resume its initial position, preferably being biased thereto by a spring or the like, thus disconnecting the generator from the line and again connecting the transducers thereto.

It has been found that when the relay coil is energized directly from the generator winding which supplies the ringing signal and which is adapted to be switch-connected to the line, the condition of that line may under certain circumstances adversely affect the switching operation. For example, if the line is but heavily loaded or short circuited when the generator is connected thereto, the voltage at the generator coils will fall to a value insufficient to energize the relay. The relay will then disconnect the generator from the line, the voltage of the generator will rise, the relay will then again be energized, and the cycle will continue, giving rise to a fluttering or vibration of the switch which not only produces an intermittent signal but which also gives rise to excessive wear or pitting of the switch contacts. We have found that this tendency is completely eliminated if the generator is provided with two separate output windings, one for producing the ringing signal and the other for energizing the relay coil. With this circuit arrangement the condition of the line when the generator is connected thereto will not affect the energization of the relay, and consequently undesired fluttering or vibration of the switch will be eliminated.

Connection of the transducers to the line immediately upon the termination of the ringing signal also presents a problem. Sometimes the charge built up in the line during the ringing operation, in leaking off to ground, will give rise to a very loud and unpleasant noise in the earpiece at the ringing station. In order to eliminate this effect we have constructed our system so that movement of the switch to transducer-connecting position is accomplished only after a time delay sufficient to permit the line to discharge. While there are various ways by means of which this time delay can be accomplished either mechanically or electrically, we have avoided the use of mechanical expedients in order to minimize cost, complexity, weight and size. Two convenient electrical arrangements are here disclosed for accomplishing this result. In one a condenser of suitable value is connected across the relay winding, and in the other a portion of the relay core is surrounded by a short circuited winding of high conductivity. Neither of these arrangements produces any appreciable delay in actuating the relay to connect the generator to the line when the generator output has reached a predetermined value, but both tend to keep the relay coil energized for a sufficient period of time after the generator output has fallen below that predetermined value so that the transducer is not connected to the line until after the line has had an opportunity to discharge. These same arrangements, of course, prevent vibration of the switch between generator-connecting and transducer-connecting positions when the output of the generator fluctuates slightly above and slightly below the relay-energizing value.

Thus the system of the present invention not only provides for improved operation of the switching mechanism but also greatly simplifies the construction involved and reduces the size, weight and cost thereof.

To the accomplishment of the above, and to such other objects as may hereinafter appear, the present invention relates to a switching arrangement for a telephone system as defined in the appended claims and as described in this specification, taken together with the accompanying drawings, in which:

Figures 1, 2:
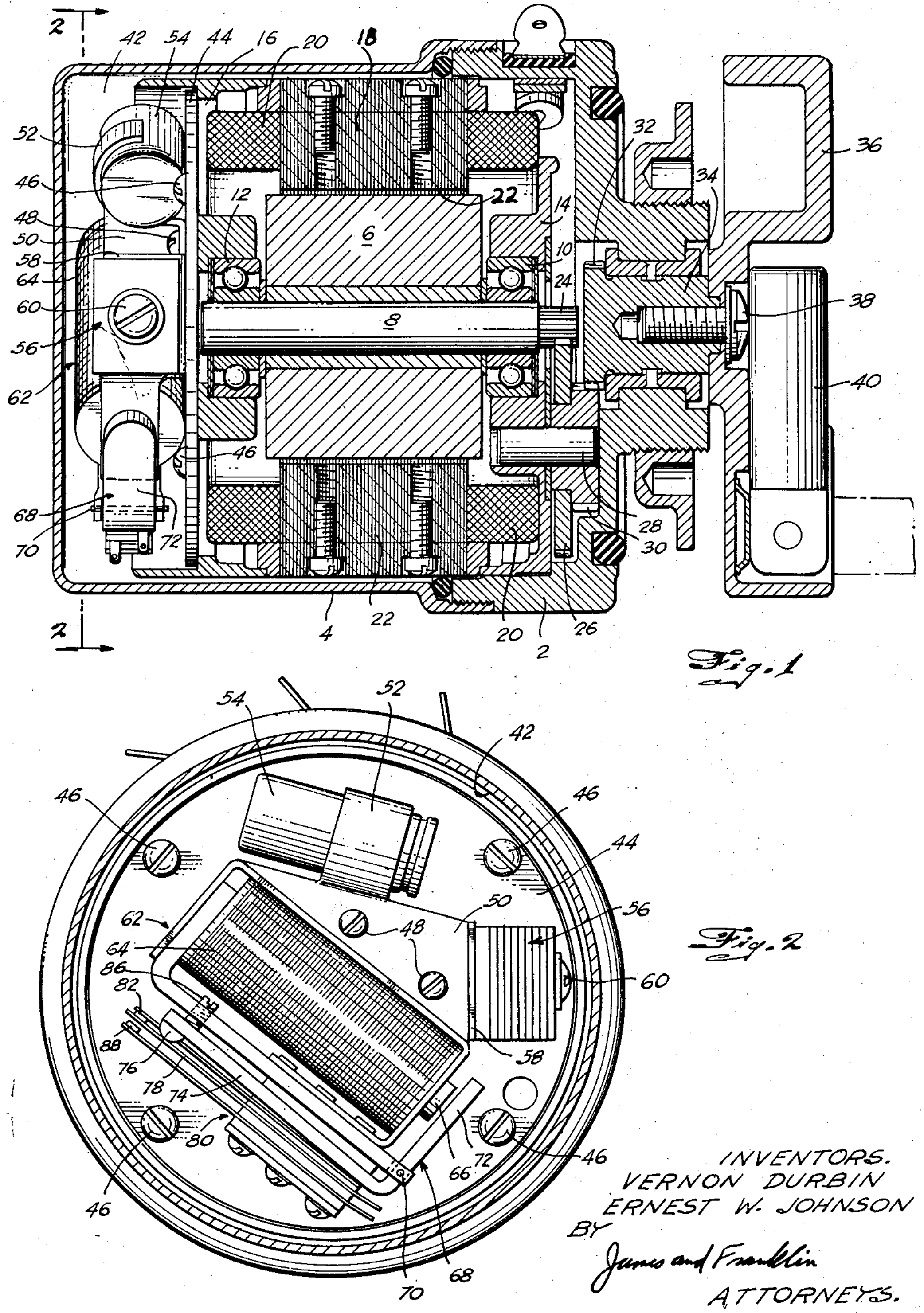
Fig. 1 is a cross sectional view of a hand crank generator provided with the switching arrangement of the present invention.
Fig. 2 is a view taken along the line 2—2 of Fig. 1.

The structure of the hand crank generator disclosed in Figs. 1 and 2 is for the most part conventional except for the elements at the extreme left hand of Fig. 1 and visible in Fig. 2. Accordingly the generator structure per se will be described only briefly, and it will be understood that those details form no part of the present invention. The generator comprises a base 2 and a removable cover shell 4 completely enclosing the operative parts of the generating and switching mechanism. A permanent magnet rotor 6 is mounted on shaft 8 to rotate therewith, with the shaft being rotatably mounted in bearings 10 and 12 retained on front and rear plates 14 and 16 respectively. A laminated stator structure 18 is mounted between the plates 14 and 15, and coils 20 are wound about the poles thereof, the rotor 6 being rotatable between the pole faces 22. The end of the shaft 8 projecting toward the base plate 2 is provided with a pinion 24 which meshes with gear 26 mounted on shaft 28, gear 30 also rotating with shaft 28 and meshing with gear 32 on shaft 34, handle 36 being connected to the shaft 34 by means of screw 38 and having a fingerpiece 40 adapted to be gripped by the operator in order to facilitate manual rotation of the handle 36, which rotation causes the rotor 6 to rotate and thus generates a voltage in the coils 20.

In hand generators as they have been known in the past, the left hand end of the shaft 8 extended into the space 42 at the left hand end of Fig. 1 and there rotated a mechanical arrangement, usually including centrifugal weights, in order to actuate a switch also mounted in the space 42. According to the present invention, however, the left hand end of the shaft 8 terminates short of the space 42. A supporting plate 44 is fixedly secured to the rear plate 16 by means of screws 46, and mounted on the plate 44 by means of screws 48 is a bracket 50. A strap 52 on the bracket 50 mounts a condenser 54 thereon, a bank of rectifiers 56 are held in place on a bracket lug 58 by means of a screw 60, and a standard type of telephone relay generally designated 62 is also mounted on the bracket 50 in any appropriate manner. That relay comprises a coil 64 wound about a core 66. An L-shaped armature 68 is pivotally mounted at 70 on the frame which supports the coil 64 and core 66, one arm 72 of the armature 68 extending over the projecting tip of the core 66 and the other arm 74 thereof carrying a button 76 which engages the center leaf 78 of a bank of switch elements generally designated 80, the inherent resiliency of the leaf 78 tending to cause that leaf to engage with contact 82 and to bias the armature 68 in a clockwise direction as viewed in Fig. 2 so that the end of the armature arm 74 engages a positive stop defined by the adjustable screw 86 mounted on the relay frame. When the relay coil 64 is sufficiently energized the armature arm 72 is attracted toward the tip of the core 66, the armature pivots in a counter-clockwise direction, and the leaf 78 is moved by the button 76 out of engagement with the contact 82 and into engagement with the contact 88.

Figure 3:
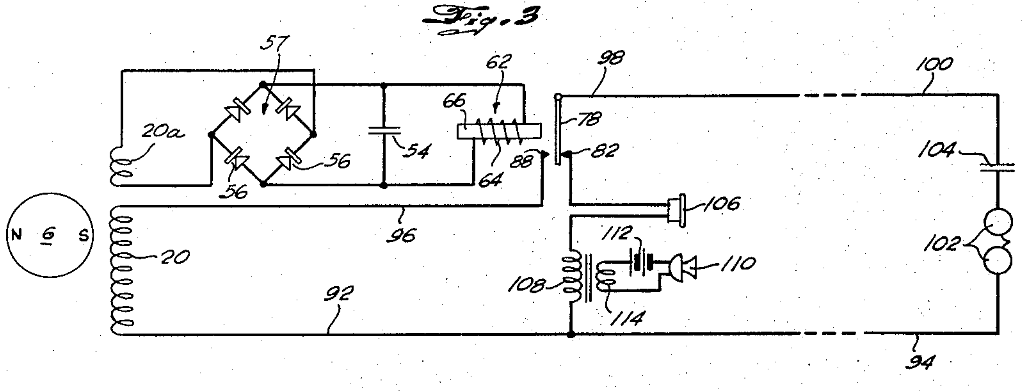
Fig. 3 is a circuit diagram of one embodiment of the present invention.
Figure 4:
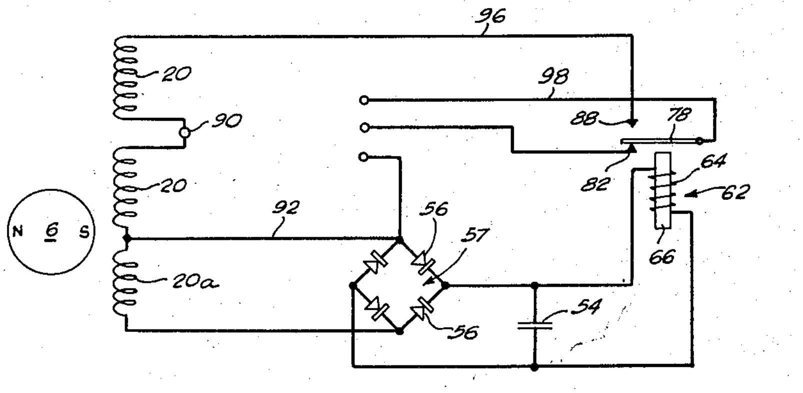
Fig. 4 is a circuit diagram showing the electrical connections within the hand crank generator of Figs. 1 and 3.
Figure 5:
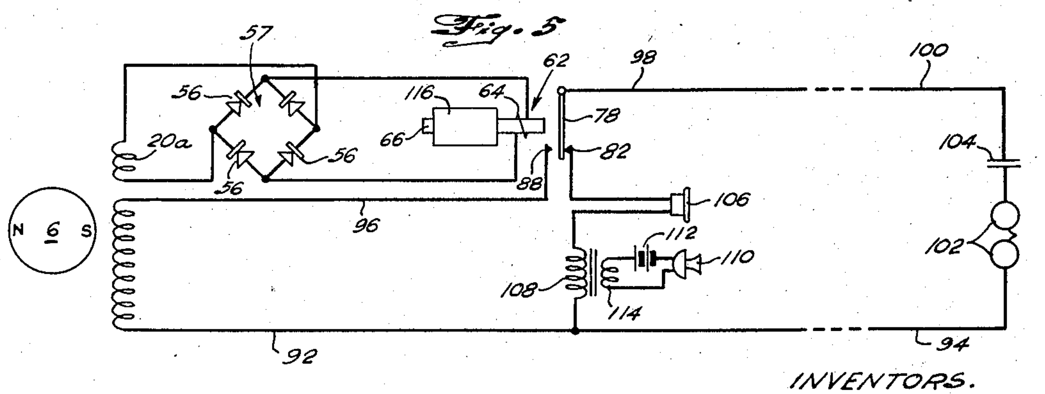
Fig. 5 is a view similar to Fig. 3 but illustrating a different means for delaying de-energization of the relay coil.

Making reference now to Figs. 3–5, in the preferred form of the present invention the generator is provided with a pair of generating windings 20 and 20*a*. As shown in Fig. 4, representing the internal connections within the generator, the ringing winding 20 may be formed of two coils, one wound on each of the poles of the generator and electrically connected at 90. The control winding 20*a* may be defined by a single coil wound about only one of the stator poles. The rectifiers 56 are connected to form a conventional full wave rectification bridge 57 which is connected across the output of the winding 20*a*, the winding 64 of the relay 62 being electrically connected to the output of the rectifier bridge 57 and therefore being energized by unidirectional, although perhaps pulsating, current the magnitude of which is dependent upon the voltage generated in the winding 20*a* and hence upon the speed at which the armature 6 is rotated. One end of the ringing winding 20 is connected by means of lead 92 to one side 94 of the line, and the other end of the winding 20 is connected by lead 96 to the contact 88. The leaf 78 is connected by line 98 to the other side 100 of the line. A bell 102 or other signaling device in series with a capacitor 104 is connected across the line 94, 100 at the station to be called. At the ringing station a receiving transducer 106 is connected between contact 82 and the side 94 of the line via a coil 108 to which the transmitting transducer 110, energized by battery 112, is inductively connected by means of coil 114.

The operation of the system of the present invention will be apparent from the above description. Initially the armature 68 will assume the position shown in Fig. 2, being biased thereto by the resiliency of the leaf 78. Electrical connection will be made between the leaf 78 and the contact 82, as shown in Figs. 3–5, and the transducers 106 and 110 will be connected across the line 94, 100. The system will then be in condition for the transmission of sound. When the armature 6 of the generator is rotated voltages will be generated in the ringing winding 20 and the control winding 20*a*. The control winding 20*a* may be so designed in conjunction with the relay coil 64 and the rectifiers 56 that when the armature 6 is rotated at approximately half its normal ringing speed the voltage generated in the winding 20*a* will produce, when rectified, a D.C. voltage across the relay coil 64 (approximately eight volts in a typical installation) sufficient to cause the armature 68 to pivot in a counter-clockwise direction as viewed in Fig. 2, thus moving the leaf 78 out of engagement with the contact 82 and into engagement with the contact 88. This will disconnect the transducers 106, 110 from the line 94, 100 and will connect the ringing winding 20 thereto. A ringing signal will therefore be applied to the bell 102 at the station being called. When the rotor 6 of the generator slows down so that the voltage generated in the control winding **20*a* is no longer sufficiently great to appropriately energize the relay coil 64, the resiliency of the leaf 78 will cause the armature 68 to pivot in a clockwise direction as viewed in Fig. 2 so as to resume its position there shown, thus disconnecting the ringing winding 20 from the line 94, 100 and connecting the transducers 106 and 110 thereacross. Since the control winding 20*a* is independent of the ringing winding 20, it will be seen that the condition of the line will not affect the energization of the relay 62. Hence even if the line is short circuited or very heavily loaded, the resultant drop in the voltage of the ringing winding 20 will have no effect on the voltage output of the control winding 20*a***.

In the embodiment of Figs. 3 and 4 a condenser 54 is connected across the relay winding 64. In the embodiment of Fig. 5 a strip of copper 116 is wound about a portion of the core 66 extending beyond the relay coil 64 so as to define a short circuited turn of high conductivity. Once the relay coil 64 has been operatively energized and if the voltage output from the control winding **20*a* should then fall below its nominal value, the effect of the condenser 54 or the short circuited turn 116 will be to delay de-energization of the relay 62 for a predetermined period of time. If this delay is not provided, the receiving transducer 106 may be connected across the line 94, 100 before the condenser 104 has discharged, and the consequent discharge of that condenser will cause a loud and unpleasant noise in the receiving transducer or earpiece 106. It is to be noted that neither the condenser 54 nor the short circuited turn 116 give rise to any appreciable delay in energization of the relay 62**.

Purely by way of example, the coil of the ringing winding 20 which is wound alone on one of the poles of the stator 18 may be formed of 3300 turns of No. 38 wire, and the coil thereof wound on the stator pole on which the control winding **20*a* is also wound may be formed of 2700 turns of No. 38 wire. The control winding 20*a* may be formed of 2400 turns of No. 44 wire. The condenser 54 may be of the tantalum type and have a value of 100 mfd. The ringing winding 20 will produce 100 volts of ringing voltage at its rated speed of rotation, while, as previously mentioned, the control winding 20*a* will produce 8 volts D.C. on the relay coil 64 when the generator rotor 6 is operating at half its rated speed, that 8 volt energization being sufficient to actuate the relay 62**.

It will be appreciated that while the invention has been here specifically disclosed in connection with a hand crank generator designed for use in a field telephone system it may be used with other types of generators both hand and motor powered, and specifically different telephone systems. Many variations may be made in the details thereof, all within the spirit of the invention as defined in the following claims.

We claim:

1. A telephone system comprising a line, a ringing generator having a variable output, a transducer, switch means having a first operative condition in which it connects only said generator output to said line and a second operative condition in which it connects only said transducer to said line, switch actuating means connected to said generator output and actuating said switch to its first operative condition in response to a predetermined generator output, and second means operatively connected to said switch and actuating said switch to its second operative condition in the absence of said predetermined generator output.

2. In the system of claim 1, means connected to said switch to render it slower-operating from its first to second operative conditions relative to operation from its second to first operative conditions.

3. A telephone system comprising a line, a ringing generator having first and second variable outputs, a transducer, switch means having a first operative condition in which it connects only said first generator output to said line and a second operative condition in which it connects only said transducer to said line, switch actuating means connected to said second generator output and actuating said switch to its first operative condition in response to a predetermined generator second output, and second means operatively connected to said switch and actuating said switch to its second operative condition in the absence of said predetermined generator second output.

4. In the system of claim 3, means connected to said switch to render it slower-operating from its first to second operative conditions relative to operation from its second to first operative conditions.

5. A telephone system comprising a line, a ringing generator having separate windings generating first and second variable outputs respectively, a transducer, switch means having a first operative condition in which it connects only said first generator output to said line and a second operative condition in which it connects only said transducer to said line, switch actuating means connected to said second generator output and actuating said switch to its first operative condition in response to a predetermined generator second output, and second means operatively connected to said switch and actuating said switch to its second operative condition in the absence of said predetermined generator second output.

6. In the system of claim 5, means connected to said switch to render it slower-operating from its first to second operative conditions relative to operation from its second to first operative conditions.

7. A telephone system comprising a line, a ringing generator having a variable output, a transducer, switch means having a first operative condition in which it connects only said generator output to said line and a second operative condition in which it connects only said transducer to said line, means biasing said switch to its second condition, and electromagnetic means electrically connected to said generator output and connected to said switch so as, when operatively energized by a predetermined output, to cause said switch to move to its first condition.

8. A telephone system comprising a line, a ringing generator having first and second variable outputs, a transducer, switch means having a first operative condition in which it connects only said generator first output to said line and a second operative condition in which it connects only said transducer to said line, means biasing said switch to its second condition, and electromagnetic means electrically connected to said generator second output and connected to said switch so as, when operatively energized by a predetermined generator second output, to cause said switch to move to its first condition.

9. In the system of claim 7, means connected to said switch to render it slower-operating from its first to second operative conditions relative to operation from its second to first operative conditions.

10. In the system of claim 8, means connected to said switch to render it slower-operating from its first to second operative conditions relative to operation from its second to first operative conditions.

References Cited in the file of this patent

UNITED STATES PATENTS

| | | |
|---|---|---|
| 1,274,857 | Cork | Aug. 16, 1918 |
| 2,518,374 | Rhoads | Aug. 8, 1950 |